US009553729B2

(12) United States Patent
Robshaw

(10) Patent No.: US 9,553,729 B2
(45) Date of Patent: Jan. 24, 2017

(54) AUTHENTICATION METHOD BETWEEN A READER AND A RADIO TAG

(71) Applicant: Orange, Paris (FR)

(72) Inventor: Matthew Robshaw, Seattle, WA (US)

(73) Assignee: ORANGE, Paris (FR)

( * ) Notice: Subject to any disclaimer, the term of this patent is extended or adjusted under 35 U.S.C. 154(b) by 205 days.

(21) Appl. No.: 14/368,166

(22) PCT Filed: Dec. 21, 2012

(86) PCT No.: PCT/FR2012/053055
§ 371 (c)(1),
(2) Date: Jun. 23, 2014

(87) PCT Pub. No.: WO2013/093373
PCT Pub. Date: Jun. 27, 2013

(65) Prior Publication Data
US 2014/0368312 A1  Dec. 18, 2014

(30) Foreign Application Priority Data
Dec. 22, 2011 (FR) .................... 11 62252

(51) Int. Cl.
*H04L 9/32* (2006.01)
(52) U.S. Cl.
CPC .......... *H04L 9/3263* (2013.01); *H04L 9/3221* (2013.01); *H04L 9/3273* (2013.01); *H04L 2209/805* (2013.01)
(58) Field of Classification Search
None
See application file for complete search history.

(56) References Cited

U.S. PATENT DOCUMENTS

| 7,362,862 | B2 * | 4/2008 | Schneier | A63F 13/12 380/251 |
| 8,429,409 | B1 * | 4/2013 | Wall | H04W 12/04 713/172 |
| 8,595,506 | B2 * | 11/2013 | Robshaw | G06F 21/10 713/182 |
| 9,219,612 | B2 * | 12/2015 | Robshaw | H04L 9/3013 |
| 9,332,430 | B2 * | 5/2016 | Robshaw | H04W 12/06 |
| 2008/0077791 | A1 * | 3/2008 | Lund | H04L 9/3273 713/156 |
| 2008/0209221 | A1 * | 8/2008 | Vennelakanti | H04L 63/062 713/183 |

(Continued)

FOREIGN PATENT DOCUMENTS

WO  2010149937 A1  12/2010

OTHER PUBLICATIONS

International Search Report and Written Opinion dated Apr. 16, 2013, for corresponding International Application No. PCT/FR2012/053055, filed Dec. 21, 2012.

(Continued)

*Primary Examiner* — Brian Miller
(74) *Attorney, Agent, or Firm* — David D. Brush; Westman, Champlin & Koehler, P.A.

(57) ABSTRACT

A method for authenticating a reader to a radio tag includes the following steps, which are implemented by the tag: receiving a piece of information ciphered by a reversible operation, which is parameterized by an authentication coupon for the reader, and a data item allowing determination of an index for identifying the authentication coupon of the reader; calculating a current authentication coupon for the reader as a function of the index; deciphering the received piece of information ciphered by the reversible operation, which is parameterized by the calculated current authentication coupon; and checking the deciphered piece of information that is intended to verify that the calculated current coupon corresponds to the authentication coupon used by the reader in order to parameterize the reversible operation.

15 Claims, 3 Drawing Sheets

(56) References Cited

U.S. PATENT DOCUMENTS

| | | | | |
|---|---|---|---|---|
| 2008/0310619 | A1* | 12/2008 | Scheidt | H04L 9/085 380/28 |
| 2011/0057779 | A1* | 3/2011 | Canard | H04L 9/3236 340/10.42 |
| 2012/0319815 | A1* | 12/2012 | Feldman | G06Q 30/0185 340/5.8 |
| 2013/0043982 | A1* | 2/2013 | Robshaw | H04W 12/06 340/10.1 |
| 2013/0097427 | A1* | 4/2013 | Billings | H04L 9/3228 713/182 |
| 2014/0368312 | A1* | 12/2014 | Robshaw | H04L 9/3221 340/5.8 |
| 2016/0078215 | A1* | 3/2016 | Robshaw | H04L 9/3215 340/10.42 |

OTHER PUBLICATIONS

Divyan M. Konidala et al., "A Simple and Cost-effective RFID Tag-Reader Mutual Authentication Scheme", Proceedings of International Conference on RFID Security (RFIDSEC) '07, Jul. 1, 2007 (Jul. 1, 2007), pp. 1-12, XP007912467.

Axel Poschmann et al., "Lightweight Cryptography and RFID: Tackling the Hidden Overheads", Dec. 2, 2009 (Dec. 2, 2009), Information, Security and Cryptology a ICISC 2009, Springer Berlin Heidelberg, Berlin, Heidelberg, pp. 129-145, XP019147088.

Zhaoyu Liu et al., "True random No. generator in RFID systems against traceability", Consumer Communications and Networking Conference, 2006. CCNC 2006. 20 06 3RD IEEE Las Vegas, NV, USA Jan. 8-10, 2006, Piscataway, NJ, USA IEEE, vol. 1, Jan. 8, 2006 (Jan. 8, 2006), pp. 620-624, XP010893171.

French Search Report and Written Opinion dated Aug. 8, 2012 for corresponding French Patent Application No. 1162252, filed Dec. 22, 2011.

International Preliminary Report on Patentability and English translation of the Written Opinion of the International Searching Authority dated Jun. 24, 2014 for corresponding International Application No. PCT/FR2012/053055, filed Dec. 21, 2012.

Girault, et al: "On the Fly Authentication and Signature Schemes Based on Groups of Unknown Order", Journal of Cryptology, 2006 International Association for Cryptologic Research, vol. 19, No. 4, pp. 463-487.

Bogdanov, et al. "PRESENT: An Ultra-Lightweight Block Cipher", Proceedings of CHES 2007, vol. 4727 of LNCS, pp. 450-466.

\* cited by examiner

AUTHENTICATION METHOD BETWEEN A READER AND A RADIO TAG

CROSS-REFERENCE TO RELATED APPLICATIONS

This application is a Section 371 National Stage Application of International Application No. PCT/FR2012/053055, filed Dec. 21, 2012, which is incorporated by reference in its entirety and published as WO 2013/093373 on Jun. 27, 2013, not in English.

FIELD OF THE DISCLOSURE

The invention concerns a technique for authentication between a reader and a radio tag.

The invention can be applied particularly advantageously to the field of radio identification, from the English "Radio Frequency Identification", or "RFID".

BACKGROUND OF THE DISCLOSURE

Radio identification is a technique for storing and retrieving data remotely by using markers called radio tags (the term "RFID tag" is also used). A radio tag is a small object, such as a self-adhesive tag, that can be stuck on, or incorporated into, objects or products. It comprises an antenna associated with an electronic chip that allows it to receive and respond to radio requests transmitted from a transceiver called a reader. By way of example, radio tags are used to identify persons when the tags are integrated in passports, in transport tickets or in payment cards, or to identify products as with a barcode.

Conventionally, when a tag comes into range of a radio reader, the reader interacts with the tag and interrogates it. During such interrogation, the reader can retrieve information belonging to the tag, such as a tag identifier, or conventionally data that are involved in authenticating the tag to a reader. This faculty for a reader to retrieve information from a tag spontaneously is not without drawbacks in terms of security. The reason is that the reader may be corrupt and under the control of an ill-intentioned person, and in some cases the spontaneous retrieval of information from a tag leads to authentication resources that belong to the tag being exhausted. This can assist carrying out a denial of service attack against the tag. It is therefore beneficial for the tag to be able to distinguish between a corrupt reader and a legitimate, or authentic, reader. Thus, it is beneficial for a tag to be able to authenticate a reader prior to authentication of the tag to the reader.

The document WO2010/149937 discloses a method for mutual authentication between a radio tag and a radio reader. Using this method, the authentication of the tag by the reader is determined by the success of the prior authentication of the reader by the tag. In order to authenticate the reader and in order to authenticate itself to the reader, the tag selects a first index i for a tag authentication coupon $x_i$ and sends the reader a data item intended to determine the value of the first index i, and the tag authentication coupon $x_i$. The reader retrieves a precalculated authentication coupon for the reader $t_j$ that is associated with a second index j. The authentication coupon $t_j$ of the reader is stored in memory by the reader; it has been precalculated by applying to the value j a pseudo random function "PRF" (from the English), which is parameterized by a regeneration key k'. The reader likewise generates a challenge c and sends the tag the challenge c, the authentication coupon of the reader $t_j$ and the second index j. The tag calculates a second authentication value for the reader $t_j'$ by applying the pseudo random function PRF that it knows, parameterized by the regeneration key k' that it has, to the second index j received from the reader. The tag then compares the second calculated authentication value $t_j'$ with the authentication coupon $t_j$ received from the reader. If the second calculated value $t_j'$ is identical to that received from the reader then that means that the reader has been correctly authenticated. The authentication of the reader by the tag is based on secret key cryptography. More precisely, the authentication of the reader is based on the use by the tag of the pseudo random function PRF that is used to precalculate the authentication coupons of the reader and on knowledge of the regeneration key k'. The pseudo random function is applied to the second index j received from the reader in order to calculate the second authentication value of the reader $t_j'$ and thus to verify the validity of the coupon received from the reader, thus proving that the reader is a legitimate reader. The success of the authentication of the reader determines the authentication of the tag by the reader. In one embodiment, the authentication of the tag is implemented by the known authentication scheme of public key cryptography "GPS" (or "cryptoGPS"), from the names of the inventors "Girault, Pales, Poupard and Stern" [M. Girault, G. Poupard and J. Stern "On the Fly Authentication and Signature Based on Groups of Unknown Order". Journal of Cryptology, pages 463-488, volume 19, number 4, 2006]. The GPS scheme is a public key authentication scheme based on the discrete logarithm problem in a multiplicative group. GPS is conventionally used so that a device, usually a device that has very little computation power, such as a radio tag, authenticates itself to a second device, typically a more powerful device, such as a radio reader. With GPS, the most costly calculations are performed by the more powerful device. This feature makes the GPS protocol highly suited to the authentication of radio tags to radio readers. In the course of the authentication of the tag, the index i initially transmitted by the tag to the reader is then advantageously used by the tag in order to calculate an authentication response to the challenge c sent by the reader. Thus, the mutual authentication method optimizes the use of the resources of the tag, which are known for being limited.

Once the mutual authentication between the reader and the tag has been performed, any additional information that flows between the tag and the reader is transmitted in plain form. However, it may be necessary to check the transmission of the information between the reader and the tag. By way of example, in the case of tags that are affixed to medicine boxes, such information intended to be read by the reader can provide details of the destination of the medicine by providing pharmacy addresses. Such information, which is sensitive, can thus be intercepted by radio by an ill-intentioned person. The authentication method described previously does not allow protection of the transmission of the information between the reader and a device that is constrained in terms of memory and computation power, such as a radio tag.

SUMMARY

An exemplary embodiment of the present invention relates to a method for authenticating a reader to a radio tag, comprising the following steps, which are implemented by the tag:

a step of reception of a piece of information ciphered by means of a reversible operation, which is parameterized by an authentication coupon for the reader, and of a data item allowing determination of an index for identifying the authentication coupon of the reader, an operation of calculation of a current authentication coupon for the reader as a function of the index, an operation of deciphering of the received piece of information ciphered by means of the reversible operation, which is parameterized by the calculated current authentication coupon, an operation of checking of the deciphered piece of information that is intended to verify that the calculated current coupon corresponds to the authentication coupon used by the reader in order to parameterize the reversible operation.

The invention originates from the transmission of a sensitive piece of information between the reader and the tag. However, the method of the invention can be applied more broadly since, by benefiting from the secure sending of the information, it allows the authenticity of the reader to be verified. Thus, owing to the method of the invention, the reader can transmit a sensitive piece of information to the tag and the tag can make sure, by means of this transmission, that the reader is authentic.

The method of the invention therefore proposes implicit authentication of the reader by means of a secure channel that is set up between the tag and the reader. The reason is that with the method of the invention the authentication coupons t, of the reader that are used to authenticate the reader to the tag are used in order to set up a secure channel between the reader and the tag. The verification of the correct setup of the secure channel via the tag then guarantees the authenticity of the reader.

This authentication is provided by the tag in the course of the checking step. A positive check on the deciphered information allows verification that the authentication coupon of the reader that is used by the reader to set up the secure channel is the same as the current authentication coupon calculated by the tag.

The setup of a secure channel allows transmission of a piece of information from the reader to the tag without any risk of interception since the information is transmitted in ciphered form. The risks of interception are always high in the case of radio communication.

Moreover, there is sharing of the exchanges between the two entities, the reader and the tag, which, instead of providing authentication of the reader by the tag by means of first exchanges, then setting up a secure channel by means of second exchanges, perform these two operations in the course of a single exchange.

With the method of the invention, the authentication coupons used for authenticating the reader and for setting up the secure channel between the two entities require only one calculation on the part of the tag, in the present case the regeneration of the coupons on the tag, the coupons then being used for deciphering the ciphered transmitted information. This calculation has already been presented as being necessary in an authentication method that is known from the prior art.

The invention also concerns a method for authenticating a reader to a radio tag comprising the following steps, which are implemented by the reader:

a step of selection of an authentication coupon for the reader, a step of ciphering of a piece of information by means of a reversible operation, which is parameterized by the authentication coupon of the reader, a step of sending of the ciphered piece of information and of a data item allowing determination of the index of the authentication coupon of the reader.

Advantageously, the method according to the invention comprises:

a step of transmission, by the tag to the reader, of a precalculated authentication coupon for the tag and of a data item allowing determination of an index for identifying the authentication coupon of the tag, a step of finalization of the authentication of the tag, said finalization step being carried out only if the calculated current coupon corresponds to the authentication coupon used by the reader in order to parameterize the reversible operation.

The authentication of the reader by the tag is coupled to authentication of the tag by the reader in accordance with cryptoGPS authentication, known from the prior art. Thus, this embodiment provides a mutual authentication protocol in which the reader is authenticated prior to the authentication of the tag. This mutual authentication does not increase the number of messages exchanged between the tag and the reader in the course of the known authentication of the tag. The protocol, initially with three passes: sending from the tag to the reader, sending from the reader to the tag and a response sent from the tag to the reader, continues to be a protocol with three passes.

Coupling the authentication of the reader by the tag to authentication of the tag by the reader in accordance with the GPS scheme is advantageous because the method of the invention takes advantage of the optimizations of the GPS scheme, particularly through the use of precalculated coupons for the tag and for the reader. Moreover, coupling the method according to the invention to GPS does not bring about any additional implementation cost for the tag. In one exemplary embodiment, the piece of information comprises a redundancy value of n bits.

The redundancy information is advantageously used to verify that the reversible operation is performed correctly, that is to say by using the correct authentication coupon $t_j$ of the reader, and that the result of the operation is transmitted correctly between the two entities. The redundancy value padd comprises n bits, for example n bits positioned at zero. Thus, when the redundancy value included in the ciphered information transmitted from the reader to the tag is checked by the tag and the check is positive, this means that the reversible operation has been performed correctly and that the transmission has gone well. It likewise means that the reader is authentic with a probability of $2^{-n}$.

Advantageously, the piece of information comprises a sensitive piece of information of m bits, which is concatenated to a redundancy value of n bits.

Thus, the secure channel set up between the reader and the tag can likewise be used to transmit a sensitive piece of information from the reader to the tag. The sensitive information can then be stored in memory by the tag. Thus, the method allows information to be entered on a radio tag safely.

Advantageously, the reversible operation consists in an EXCLUSIVE OR between the authentication coupon of the reader and the piece of information.

In this embodiment, the reversible operation used to set up the secure channel between the reader and the tag, in the present case an EXCLUSIVE OR, uses n+m bits of the authentication coupons $t_i$ of the reader as a mask for a piece of information to be transmitted securely between the two entities. This embodiment is very advantageous because the EXCLUSIVE OR operation does not require an additional circuit on the tag.

The reason is that the EXCLUSIVE OR is a basic operation that is available on circuits such as radio tags. Thus, the implementation of the deciphering of the ciphered received information, or even the ciphering of a second piece of information for the attention of the reader, is therefore not costly for a device such as a radio tag, which is renowned for being highly constrained in terms of memory and computation power.

In another exemplary embodiment, the reversible operation is the block cipher algorithm PRESENT, parameterized by the authentication coupon of the reader and applied to the piece of information.

This variant embodiment proposes a block cipher algorithm that is suited to being implemented on radio tags. The reason is that it is very light in terms of implementation.

Moreover, the PRESENT algorithm is safe in terms of security. One and the same authentication coupon $t_i$ for the reader, or more precisely the same bits of a coupon, can be used both for transmitting a secure piece of information from the reader to the tag and for transmitting a second piece of secure information from the tag to the reader.

In one exemplary embodiment, in which the reversible operation is an EXCLUSIVE OR, the step of finalization of the authentication of the tag comprises, when the current authentication coupon of the reader comprises n+m first bits followed by m' second bits:
  a step of transmission, from the tag to the reader, of a second sensitive piece of information of m' bits, the transmission step comprising:
    an EXCLUSIVE OR operation between the m' second bits of the current authentication coupon of the reader and the m' bits of the second piece of information,
    a step of sending of the second ciphered sensitive piece of information.

In this exemplary embodiment, corresponding to the case in which the reversible operation REV consists in an EXCLUSIVE OR, the mask used to transmit a first sensitive piece of information of m bits from the reader to the tag, and then a second sensitive piece of information of m bits from the tag to the reader, is different from one instance of sending to another, although based on the same authentication coupon $t_i$ of the reader of n+m bits. This precaution is necessary in order to guarantee the security of the transmission, notably of the transmission of the second sensitive piece of information. Thus, in this exemplary embodiment, although a single authentication coupon $t_i$ is used, the security of the transmission is guaranteed by the use of a plurality of masks corresponding to blocks of n+m bits of the authentication coupon $t_j$.

In another exemplary embodiment, where the reversible operation is the PRESENT algorithm, the step of finalization of the authentication of the tag comprises:
  a step of transmission of a second sensitive piece of information from the tag to the reader, the transmission step comprising:
    application of the PRESENT cipher algorithm, parameterized by the authentication coupon ($t_j'$) of the reader, to the second sensitive information,
    a step of sending of the second ciphered sensitive piece of information to the reader.

In this exemplary embodiment, the reversible operation is a block cipher algorithm. The security inherent in these algorithms allows the use of the same bits of an authentication coupon for the reader as a single cipher key for the algorithm whether for sending a first sensitive piece of information from the reader to the tag or a second sensitive piece of information from the reader to the tag.

Advantageously, the authentication coupon of the reader $t_i$ is obtained by application of a block cipher algorithm in OFB mode, parameterized by a regeneration key, to the index.

Calculating the authentication coupons $t_i$ of the reader by means of a block cipher algorithm in OFB mode or in CTR mode allows the size of the generated coupons to be checked. The reason is that one iteration of the cipher algorithm produces a block of data that is provided at the input of the next iteration of the algorithm, which produces a second block. The final pseudo random sequence is obtained by concatenation of the blocks produced. Thus, the greater the number of iterations performed by the cipher algorithm, the longer the pseudo random sequence produced. Thus, the number of iterations can be defined on the basis of the desired size of the authentication coupons t, of the reader. It can be seen that this embodiment is particularly suited when the reversible operation REV is an EXCLUSIVE OR. The reason is that in this case n+m bits of a coupon are used to transmit a piece of information. The size of the coupon can therefore be anticipated on the basis of the number of secure exchanges anticipated between the two entities and the size of the sensitive information to be transmitted.

The invention likewise relates to a radio tag suited to authenticating a radio reader (R) and to authenticating itself to a radio reader, and comprising:
  reception means, designed to receive a piece of information ciphered by means of a reversible operation, parameterized by the authentication coupon of the reader, and a data item allowing determination of an index for identifying the authentication coupon of the reader,
  calculation means, designed to calculate a current authentication coupon for the reader as a function of the index,
  decipher means, designed to decipher the received piece of information ciphered by means of the reversible operation parameterized by the calculated current authentication coupon,
  checking means, designed to check the piece of information and to verify that the calculated current coupon corresponds to the authentication coupon used to parameterize the reversible operation.

The invention also concerns a radio reader suited to authenticating itself to at least one radio tag and to authenticating the tag, said reader comprising:
  selection means, designed to select an authentication coupon for the reader,
  cipher means, designed to cipher a piece of information by means of a reversible operation, parameterized by the authentication coupon of the reader,
  sending means, designed to send the ciphered piece of information and a data item allowing determination of an index for identifying the authentication coupon of the reader.

The invention likewise relates to a radio authentication system comprising:
  a radio reader according to the invention, and
  at least one radio tag according to the invention.

The invention likewise concerns a computer program intended to be installed in a memory of a radio reader, comprising instructions for the implementation of the steps of the method for mutual authentication of a radio tag and of a reader according to the invention that are carried out by the reader when the program is executed by a processor.

Finally, the invention concerns a data storage medium in which the program according to the invention is recorded.

BRIEF DESCRIPTION OF THE DRAWINGS

Numerous details and advantages of the invention will be better understood upon reading the description of a particular embodiment with reference to the appended drawings, which are provided in a non-limiting manner and in which.

DETAILED DESCRIPTION OF ILLUSTRATIVE EMBODIMENTS

The method for authentication between a reader and a radio tag, or "RFID" (from the English "Radio Frequency Identification") tags, according to the invention can be used in conjunction with a variety of schemes for authenticating a tag to a reader. Such schemes may be based on public key cryptography or on secret key cryptography. However, a known scheme for identifying a tag to a reader, called "GPS", on abbreviation of "Girault, Pales, Poupard and Stern", the names of the inventors, is particularly well suited to be used in relation with the method according to the invention because it does not bring about any cost of implementation for the tag, the resources of which are known for being limited. The GPS scheme is a public key authentication technique. It is a protocol of "zero-knowledge" type (or of a type "involving zero disclosure of knowledge"), the security of which is based on the difficulty of the discrete logarithm in a group. By way of example, the implementation of this scheme may be based on elliptic curve based cryptography.

This scheme is commonly used so that a device having very little power, in terms of memory and/or computation power, authenticates itself to a second device, which is more powerful. The protocol is such that the cost of the authentication for the least powerful device can be greatly reduced by means of a series of optimizations. By way of example, an optimization for the GPS scheme is based on what is known as "a coupon" mode. This mode involves calculating all that can be calculated prior to an authentication session, leaving a minimum of operations to be carried out during the actual authentication session. This makes the GPS protocol very well suited to applications based on the use of radio tags.

Figure 1:
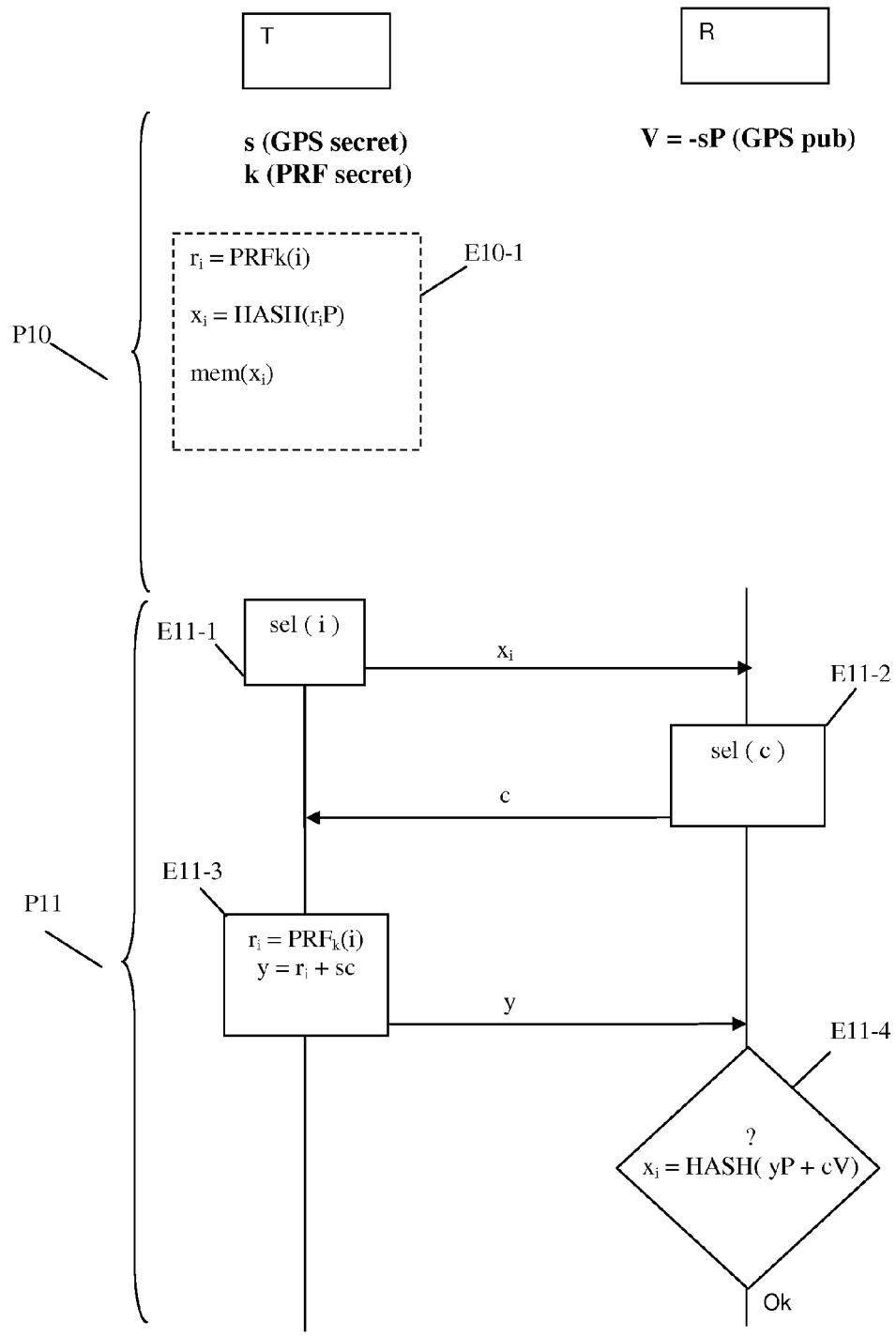
FIG. 1 shows the steps of a known scheme for authenticating a tag to a reader, in the present case the GPS scheme, according to a prior art.

Thus, firstly, and with the aim of facilitating comprehension of the mutual authentication method according to the invention, which, for the authentication of the tag by the reader, is based on the GPS scheme, reference is made to FIG. 1 in describing an implementation example for a scheme for GPS authentication of a radio tag to a reader, according to a prior art. The GPS implementation example described here is based on elliptic curves; it uses a subgroup of points generated by a point P on a curve E. The implementation described here uses tag authentication coupons and regeneration of randoms associated with each of these coupons by the tag, which constitute optimization in a basic GPS scheme. In this exemplary embodiment, the arithmetic calculations on the elliptic curves are carried out on the reader, whereas only basic arithmetic operations are carried out by the tag. It can be seen that this example is very beneficial in terms of performance and implementation space for the tag.

According to this scheme, an authentication system comprises at least one tag T that is suited to authenticating itself to a reader R when it comes into proximity of the reader R.

The scheme conventionally comprises two phases: a configuration phase P10, in the course of which the authentication data are calculated and/or provided for the tag T and for the reader R, and an authentication phase P11, in the course of which the tag T authenticates itself to the reader R. The configuration phase P10 can be carried out only once in the life of the system. The authentication phase P11 is carried out each time the tag is authenticated to the reader R.

In the course of the configuration phase P10, a pair of GPS keys (s, V) is generated. The pair comprises a secret key s and an associated public key V. The secret key s, belonging to the tag T, is stored in the tag T and is never extracted, nor transmitted outside the tag T. The public key V can be accessed by the reader R. The keys s and V are linked according to the following formula: V=−sP, where P is a point on the elliptic curve E, which point is known to the reader R. In other words, the public key V is calculated in accordance with the addition on the elliptic curve by adding the point P, s times. In the embodiment of the GPS scheme that is described here, sometimes called "reduced coupons" mode, a second secret key k, called a regeneration key, is installed on the tag T. It is used as a parameter for a pseudo random function "PRF" installed on the tag T.

In the course of the configuration phase P10, in a configuration step E10-1, a predetermined number p of values, commonly called authentication coupons for the tag, and denoted by $x_i$, $1 \leq i \leq p$, is precalculated. The coupon with the subscript i is denoted by $x_i$. The subscript i is an identification index for the coupon $x_i$. In order to calculate the coupon $x_i$, a random $r_i$ is generated by means of the pseudo random function PRF parameterized by the regeneration key k and applied to the index i (that is to say: $r_i=PRF_k(i)$). The coupon $x_i$ for authenticating the tag is then calculated in accordance with the following formula: $x_i=HASH(r_iP)$, where HASH is a known hash function, applied to the addition on the elliptic curve of the point P, $r_i$ times. This addition, and to a lesser extent the evaluation of the hash function HASH, are operations that are costly in terms of computation power. Thus, commonly, the coupons $x_i$ are precalculated by a computation entity (not shown) of the authentication system, which is different than the tag T and the reader R. The authentication coupons of the tag $x_i$ are then stored on the tag T, in a memory—not shown—of the tag T, in order to be used in the course of authentications to the reader R.

In the course of the authentication phase P11, in an initial step E11-1 of selection and sending, the tag T selects a coupon $x_i$ with the index i. At the end of step 11-1, the selected coupon $x_i$ is sent to the reader R.

In a step E11-2 of selection and sending of a challenge, the reader R generates a challenge c. The challenge c is generated in a random manner. At the end of step E11-2, the challenge c is sent by the reader R to the tag T.

In a step E11-3 of regeneration and calculation, the random $r_i$ is regenerated by the tag T. For this purpose, the pseudo random function PRF installed on the tag T and parameterized by the secret regeneration key k is applied to the index i that identifies the coupon $x_i$. It is known that the pseudo random function requires little computation power for the tag T. The tag T then calculates a response y to the challenge c by means of the following formula: $y=r_i+s\ c$. The response y is the sum of the random $r_i$ and the scalar product of the secret key s and the challenge c. At the end of step E11-3, the response y is sent to the reader R.

In a step 11-4 of verification, the reader R verifies that the coupon $x_i$ received from the tag at the end of step E11-1 is equal to a value obtained by applying the hash function HASH to the addition on the elliptic curve of the point P, y times, with the scalar product of the challenge c and the public key V: $x_i$=HASH(yP+cV).

If the verification is positive (Ok branch in FIG. 1), then the tag T has been correctly authenticated to the reader R.

By way of example, the HASH function is the SHA-1 function or the SHA-2 function (for "Secure Hash Algorithm").

Usually, after the initialization phase P10, the secret regeneration key k is present only on the tag; it never leaves the tag and is not intended to be shared with another entity, with the possible exception of the computation entity that is capable of precalculating the authentication coupons of the tag $x_i$. The secret regeneration key k is different than the secret key s. However, in one implementation example for the GPS scheme, it can be derived from the secret key s.

In another implementation example for the GPS scheme (not shown), which constitutes another optimization for the scheme, the authentication coupons of the tag $x_i$ are precalculated and stored on the reader, or delivered to the reader by the computation entity through a communication channel. In this case, the tag can transmit only the index i of the coupon $x_i$ in the course of step E11-1 of selection and sending.

In a variant embodiment of the GPS scheme that is not described, the tag authentication coupons thus stored on the tag T are pairs $(x_i, r_i)$, or "unreduced coupons". In this variant, the randoms $r_i$ are therefore stored in the tag and are therefore not regenerated during the authentication, as is the case in the scheme described previously. It will be noted that this variant is less beneficial in terms of occupation of the memory space of the tag T, since it requires the tag to store more information.

A method for authentication between a radio reader and a radio tag, according to a first exemplary embodiment of the invention, will now be described in relation to FIG. 2.

Although the method is illustrated here with the GPS authentication protocol as far as the authentication of the tag by the reader is concerned, the method is not limited to this example. Thus, the method according to the invention may comprise authentication of the tag by the reader in accordance with other models for authentication of a tag by a reader. The protocols for authentication of a tag by a reader may be protocols based on public key or secret key cryptography. However, GPS authentication is particularly suited in the case of tags that are constrained in terms of memory and computation power.

The method according to the invention comprises a configuration phase P20, in the course of which authentication data are calculated and/or provided for the tag T and for the reader R, and a first authentication phase P21 and, where appropriate, a second authentication phase P22, in the course of which phases the reader R is authenticated by the tag T, and then the authentication of the tag T by the reader R is finalized. The configuration phase P20 can be carried out only once in the life of the system. The authentication phase P21, and, where appropriate, the phase P22, are carried out for each authentication between the tag and the reader R. It will be noted that the two authentication phases P21 and P22 are interleaved, that is to say that data interchanges in the course of the first authentication phase P21 are used in order to perform the second authentication phase P22. However, for the purpose of simplification, the first authentication phase P21 is considered to be dedicated to the authentication of the reader R by the tag T, and the second authentication phase P22 is considered to be dedicated to the authentication of the tag by the reader. Thus, in the course of the first authentication phase P21, the reader R is authenticated by the tag T according to the invention through a secure channel that is set up between the reader R and the tag T. If the authentication of the reader R is successful, then the authentication continues with the second authentication phase P22, in the course of which the authentication of the tag T by the reader R, possibly through the secure channel that is set up between the two entities, is carried out.

In the course of the configuration phase P20, a pair of GPS keys (s, V) is generated for the tag T. The pair comprises a secret key s and an associated public key V. The secret key s is stored in the tag T and is never transmitted outside the tag T. The public key V can be accessed by the reader R. The keys s and V are linked in accordance with the following formula: $V=-sP$, where P is a point on an elliptic curve E. In other words, the public key V is obtained by adding the point P, s times. In the embodiment of the GPS scheme that is described here, sometimes called "reduced coupons" mode, a second secret key k, called a regeneration key for authentication coupons for the tag, or first regeneration key, and comparable with the secret key k shown in FIG. 1, is stored in the tag T. It is used as a parameter for a first pseudo random function PRF installed on the tag T. The first secret regeneration key k is different than the secret key s. However, it can be derived from the secret key s. A third secret key k', called a regeneration key for authentication coupons for the reader, or second regeneration key, is stored in the tag T. It is used as a parameter for a second function, denoted by FUNCTION, that is known to the tag T and suited to generating pseudo random sequences.

During the configuration phase P20, a predetermined number q of authentication coupons $t_j$ for the reader, $1 \le j \le q$, is likewise calculated. The q authentication coupons $t_j$ of the reader are calculated in advance in a pseudo random manner by a computation entity, not shown in FIG. 2, in accordance with the following formula: $t_j$=FUNCTION$_{k'}$(j). In other words, each authentication coupon $t_j$ results from the application of the second function FUNCTION parameterized by the second regeneration key k' to the index j. The authentication coupons $t_j$ of the reader, that is to say the elements leaving the second function FUNCTION, are pseudo random bit sequences. By convention, it can be noted that the authentication coupons $t_j$ have a size of at least n+m bits, with $n \ge 1$, and $m \ge 0$.

The authentication coupons $t_j$ of the reader are then stored in a coupon memory of the reader R, which memory is not shown, in the course of a step E20-1 of memory storage. It can be noted that, in the particular embodiment described in relation to FIG. 2, the reader R does not have the second regeneration key k' for the authentication coupons $t_j$ of the reader and is therefore not suited to calculating the authentication coupons $t_j$.

In the course of the configuration phase P20, in a step E20-2 of configuration, comparable to configuration step E10-1 as shown in FIG. 1, a predefined number p of authentication coupons for the tag $x_i$, $1 \leq i \leq p$, is precalculated. In order to calculate the coupon $x_i$, the computation entity generates a random $r_i$ by means of the first pseudo random function PRF parameterized by the first regeneration key k and applied to the index i. In other words, $r_i = PRF_k(i)$. The authentication coupon $x_i$ of the tag is then calculated in accordance with the following formula: $x_i = HASH(r_i P)$. In other words, the authentication coupon x, of the tag T is the result of the hash function HASH applied to the addition of the point P, $r_i$ times. The tag authentication coupons $x_i$ are precalculated by the computation entity and are stored on the tag T in order to be used in the course of authentications of the tag T to the reader R. The HASH function is the SHA-1 function, or the SHA-2 function, for example.

In the first authentication phase P21, in an initial step E21-1 of selection and sending, the tag T selects a first index i for a tag authentication coupon $x_i$ and sends the reader R a first data item that is intended to determine the first index i used by the tag, and the authentication coupon $x_i$.

In a step E21-2 of selection of an authentication coupon $t_j$ for the reader, the reader R selects a precalculated coupon $t_j$ associated with a second index j. By way of example, the authentication coupons $t_j$ of the reader are stored in memory in a table having q entries, the j-th entry of which comprises the coupon $t_j$ for authenticating the reader.

In a subsequent step E21-3 of generation of a challenge c, the reader R generates a challenge c in a random manner.

In a subsequent step E21-4 of ciphering, a reversible operation REV, parameterized by the authentication coupon $t_j$ of the reader, is applied to a piece of information comprising at least one predefined redundancy value padd of n bits (the term usually used for the redundancy value is the English term "padding"). In other words, the information is ciphered by applying the reversible operation REV to the authentication coupon $t_j$ of the reader and to the information that comprises the redundancy value. By way of example, the redundancy value consists of n bits positioned at zero: it is denoted by padd=[000 . . . 000]. It will be recalled that an operation $OP_t$ is reversible if there is a second operation, denoted by $OP_t^{-1}$, such that, by successively applying the reversible operation $OP_t$ to an element x, and then the second operation $OP_t^{-1}$ to the result obtained, then x is obtained. In other words $OP_t^{-1}(OP_t(x))=x$. In a first exemplary embodiment of the invention, the reversible operation REV consists in a bit-by-bit EXCLUSIVE OR, denoted by $\oplus$, between the authentication coupon $t_j$ of the reader and the information that consists of the predefined redundancy value padd. It is usually said that the authentication coupon $t_j$ is used as a mask for the information. The reader R then calculates a masked, or ciphered, piece of information, denoted by $z_j$, by operating an EXCLUSIVE OR between the authentication coupon $t_j$ of the reader and the information equal to the redundancy value padd. Thus, $z_j = t_j \oplus [000 \ldots 000]$ is calculated. It will be noted that in the event of the reversible operation $OP_t$ being an EXCLUSIVE OR, the second operation, denoted by $OP_t^{-1}$, likewise consists in an EXCLUSIVE OR. Thus, in this first example, $OP_t^{-1} = OP_t$.

In a step E21-5 of sending, the previously calculated ciphered information $z_j$, the challenge c generated in the course of step E21-3 and a second data item intended to determine the value of the second index j used by the reader R are sent to the tag T. By way of example, the second data item is the second index j. Thus, instead of using the authentication coupons $t_j$ of the reader by transmitting them in plain form directly to the tag, as is the case in the method for mutual authentication between the reader and the tag that is described in the application WO2010/149937, the authentication coupons $t_j$ of the reader are transmitted in ciphered form to the tag T.

In a step E21-6 of reception, the ciphered information $z_j$, the challenge c and the second index j are received by the tag T.

In a step E21-7 of regeneration of the authentication coupon of the reader, the tag T calculates a current authentication coupon $t_j'$ for the reader by applying the second function FUNCTION that it knows, which is parameterized by the second regeneration key k' that it has, to the second index j that it has received in the course of the previous step.

In a step E21-8 of deciphering, the tag T deciphers the information $z_j$ received from the reader R in the course of step E21-5 by means of the reversible operation REV, parameterized by the current coupon $t_j'$ calculated in the course of the previous step. In other words, the tag T calculates $REV(t_j', z_j)$. In the example described here, the tag therefore calculates $t_j' \oplus z_j$. It will be noted that by using an EXCLUSIVE OR operation, no additional circuit is necessary on the tag since the EXCLUSIVE OR is a basic operation of an electronic circuit such as a radio tag. Thus, the method according to the invention does not prompt an additional component on the tag T in order to execute this decipher operation.

In a step E21-9 of checking the information, the tag T verifies the deciphered information. It will be understood that by deciphering the ciphered information $z_j = REV(t_j', padd)$ by means of the reversible operation REV, parameterized by the current authentication coupon calculated by the tag T, and therefore by calculating $REV(t_j', REV(t_j, padd))$, the n first bits obtained correspond to the redundancy value padd from the moment at which the authentication coupon $t_j$ selected by the reader is equal to the current coupon $t_j'$ calculated by the tag. Thus, in the checking step, the tag T verifies that the n first bits of the result of the deciphering of the ciphered information $z_j$ are equal to the redundancy value padd.

In a first case, in which the check on the information is positive (ok branch in FIG. 2), that is to say in a case in which the n first bits obtained are equal to the redundancy value padd, this means that the current coupon $t_j'$ calculated by the tag corresponds to the coupon $t_j$ used by the reader R in order to cipher the information. In other words, this means that the reader R has correctly authenticated itself. More precisely, on account of the use of the redundancy value padd of n bits, the probability of the reader R being authentic is $2^{-n}$.

In a step E22-1 of finalization of the authentication, which belongs to the authentication phase P22 for the tag, the tag regenerates the random $r_i$ by applying the first pseudo random function PRF, parameterized by the first regeneration key k, to the first index i, selected in the course of step E21-1 of selection. Next, the tag T calculates a response y to the challenge c received from the reader R. Step E22-1 is comparable with step E11-3 of regeneration and calculation according to FIG. 1. At the end of step E22-1, the tag T sends the reader R the calculated response y.

In a step E22-2 of verification, comparable with verification step E11-4 according to FIG. 1, it is verified that the authentication coupon $x_i$ received from the tag T at the end of step E21-1 is equal to the value obtained by applying the hash function HASH to the addition on the elliptic curve of the point P, y times, with the scalar product of the challenge c and of the public key V: $x_i = HASH(yP + cV)$. If the verification is positive (ok branch in FIG. 2), then the tag T has correctly authenticated itself to the reader R, after having authenticated the reader R.

In a second case, in which the verification of the information is negative (nok branch in FIG. 2), that is to say in a case in which the n first bits obtained by deciphering the ciphered information $z_j$ are not equal to the redundancy value padd, this means that the reader R is not correctly authenticated. In a step E21-10 of ending, the method stops. The reason is that the authentication phase of the tag T does not need to take place since the reader R is not authentic.

It will be noted that when the authentication of the reader R fails, the response to the challenge c, y, is not sent to the reader R. Thus, the authentication coupon $x_i$ of the tag, although sent to the reader in the course of step E21-1, is not used. It can be reused for a later authentication.

Figure 2:
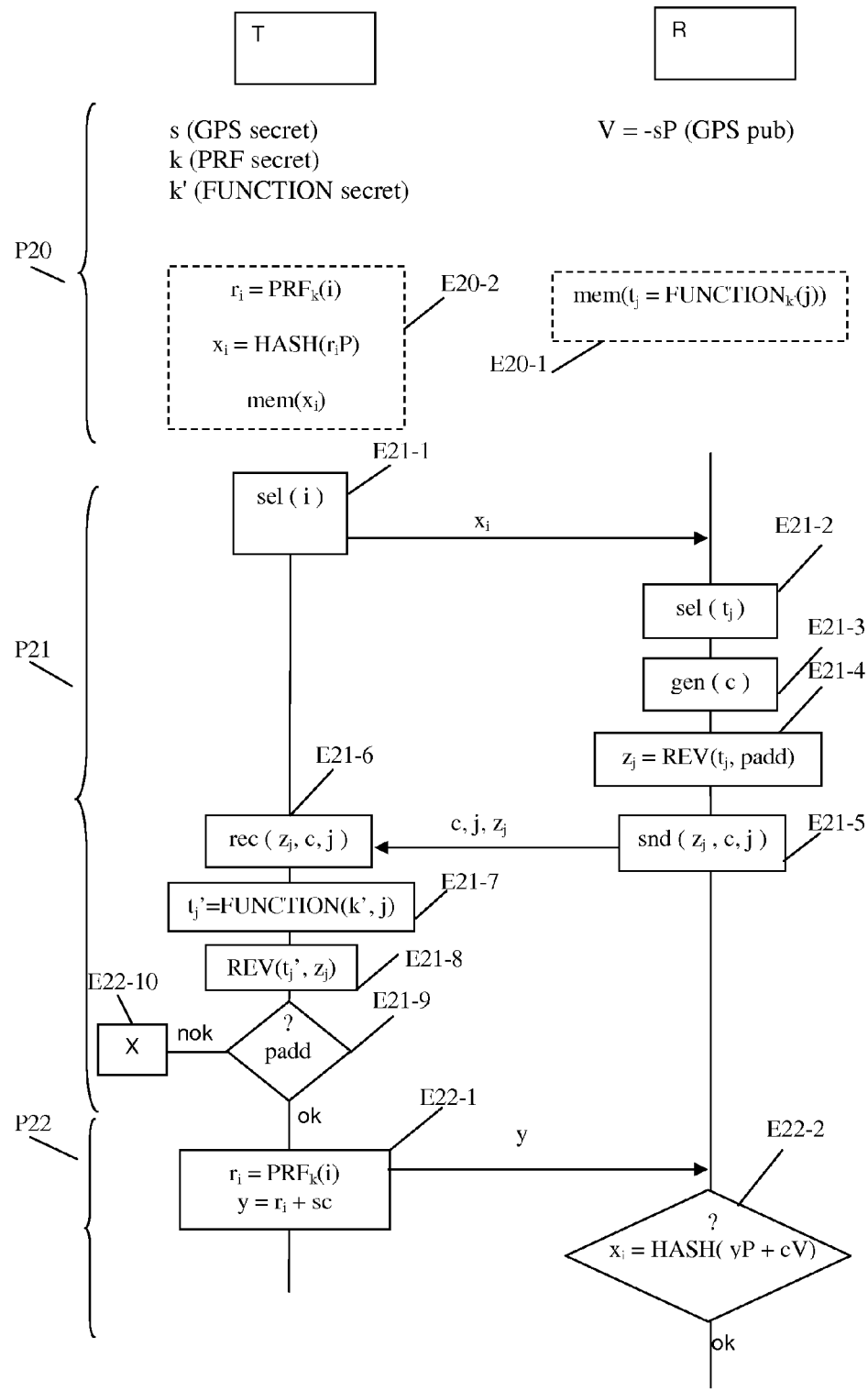
FIG. 2 shows the steps of a scheme for authentication between a radio reader and a radio tag according to a first exemplary embodiment of the invention.

In a second exemplary embodiment of the invention, not shown in FIG. 2, the reversible operation REV is an EXCLUSIVE OR operation and the information that is ciphered in the course of cipher step E21-4 comprises the redundancy value padd, concatenated to a sensitive piece of information info_s that the reader R wishes to transmit to the tag T in a secure manner. In other words, in this example, $z_j$=REV($t_j$, ([000 . . . 000]||info_s)), or $z_j$=$t_j \oplus$([000 . . . 000]||info_s), where '||' represents the concatenation. The sensitive information info_s is a data item of m bits. Thus, the sensitive information info_s is transmitted in a manner masked by the n+m first bits of the authentication coupon $t_j$. It is therefore transmitted in a secure manner.

When the ciphered information $z_j$ is received by the tag T in the course of step E21-6 of reception, it is deciphered by the tag T in accordance with step E21-8 of deciphering. Since the tag knows the redundancy value padd, it easily recovers the sensitive information info_s following a check on the redundancy value. Thus, in this second exemplary embodiment, the secure channel set up between the reader and the tag T in the course of the authentication of the reader by the tag allows not only verification that the reader R is authentic but also transmission of a sensitive piece of information info_s in a secure manner. The tag can therefore store the sensitive information info_s in memory. In the case of radio tags affixed to medicine boxes, the sensitive information may consist of pharmacy addresses to which the boxes need to be delivered.

In a variant embodiment of the invention, where the reversible operation REV is an EXCLUSIVE OR, the tag T can likewise communicate with the reader R in a secure manner and can transmit a second sensitive piece of information info_s2 of m' bits to the reader R in the course of step E22-1 of finalization of the authentication. The second sensitive information info_s2 may consist of the response to the challenge c, y, calculated by the tag T in the course of step E22-1, or any other sensitive information that it is important not to transmit in plaintext form by radio. In the case of medicine boxes, the second sensitive information may be the address of the pharmacies to which the boxes need to be delivered and that needs to be read by another reader in a distribution chain for the medicines. In this variant, the tag T uses the reversible operation REV, parameterized by the m' bits following the n+m first bits of the current authentication coupon $t_j'$ calculated in the course of step E21-7, to cipher the second sensitive information info_s2. For the record, if the authentication of the reader R by the tag T has been successful, the current coupon $t_j'$ is equal to the authentication coupon $t_j$ of the reader. It will be noted that, in order to transmit the second sensitive information info_s2, the mask used consists of the m' bits following the n+m first bits of the authentication coupon t, that are used as a mask for sending the ciphered information $z_j$. This is because it is known that, for reasons of security, it is preferable, in the case of an EXCLUSIVE OR operation, not to use the same mask several times, in the present case the same n+m bits of the authentication coupon $t_j$ of the reader that are used for the secure transmission from the reader R to the tag T. Moreover, it is not useful to use the redundancy value padd, since the authentication of the tag is ensured by the protocol for authenticating the tag to the reader, in the present case using cryptoGPS.

It will be noted that the method of the invention involves sharing of the exchanges that are inherent in the authentication and in the sending of sensitive information between the two entities. This is because a first sensitive piece of information info_s is transmitted during the authentication of the reader R to the tag T, and a second sensitive piece of information info_s2 is transmitted during the authentication of the tag T to the reader R.

It will be understood that, by following this principle, it is again possible to transmit other sensitive information between the tag and the reader. It will likewise be understood that, in the example in which the reversible operation REV is an EXCLUSIVE OR operation, the size of the authentication coupons $t_j$ needs to be large, for example in the order of 1024 or 2048 bits. More precisely, the size of the authentication coupons of the reader needs to be proportioned as a function of the size of the information to be transmitted and the number of secure exchanges anticipated.

In a variant embodiment of the invention, the data item transmitted from the reader R to the tag T in the course of step E21-5 of sending and intended to determine the second index j may be a counter value deducted from j but different from j, for example the j-th state of a shift register LFSR ("Linear Feedback Shift Register") initialized with a non-zero constant. In a second variant, the tag accesses the second index j, in accordance with a rule for calculating the index that is known to the tag T and to the reader. In a third variant, the reader R transmits only the bits of low weight from the second index j to the tag T.

In the exemplary embodiment described in relation to FIG. 2, the reader R stores a plurality of authentication coupons $t_j$ in memory. In another exemplary embodiment of the invention, the reader R recovers the authentication coupons $t_j$ of the reader in real time from a trusted entity, through a trusted channel.

In the exemplary embodiments described previously, the reversible operation REV consists of an EXCLUSIVE OR. The invention is not limited to this example, of course, and numerous symmetric cipher algorithms can be used. In a second exemplary embodiment, the reversible operation REV consists of the PRESENT algorithm ("PRESENT: An Ultra-Lightweight Block Cipher", A. Bogdanov, L. R. Knudsen, G. Leander, C. Paar, A. Poschmann, M. J. B. Robshaw, Y. Seurin, and C. Vikkelsoe, in Proceedings of CHES 2007, volume 4727 of LNCS, pages 450-466). The PRESENT algorithm is a block cipher algorithm that is very light in terms of implementation. It is suited to be used in constrained environments such as radio tags. In this case, the authentication coupon $t_j$ of the reader is called cipher key. In the variant described previously in which the information corresponds to the redundancy value padd, step E21-4 of ciphering then involves ciphering the redundancy value padd by means of the cipher algorithm, parameterized by the authentication coupon $t_j$ of the reader.

In the exemplary embodiment in which the reversible operation REV is a block cipher algorithm, the same bits of the authentication coupon $t_j$ of the reader that are used as a cipher key for the reversible operation REV can be used just as well for transmitting a piece of information in a secure manner from the reader R to the tag as from the tag T to the reader R. This is because the security that is inherent in the block cipher algorithms does not require modification of the cipher key whenever sensitive information is sent. Thus, in the case in which the reversible operation REV is a block cipher algorithm, the size of the authentication coupons $t_j$ of the reader is not determined by the size of the information to be transmitted in a secure manner, nor by the number of secure exchanges between the reader R and the tag T. By way of example, the authentication coupons of the reader are of a size in the order of 80 or 128 bits.

In an exemplary embodiment of the invention, the first function FUNCTION used for generating authentication coupons $t_j$ for the reader is a block cipher algorithm, for example the PRESENT algorithm, used in "OFB" (from the English "Output Feedback") mode. A block cipher algorithm used in OFB mode allows the production of a pseudo random sequence made up of the blocks produced by the algorithm upon each iteration. More precisely, the block cipher algorithm, parameterized by a secret key, in this case the second regeneration key k', and applied to an initialization value likened to plaintext, in this case the index j, produces, in a first iteration, a cipher that constitutes a first block of a cipher sequence, or pseudo random sequence. Each of the following pseudo random sequence blocks is then obtained by means of iteration of the block cipher algorithm from the cipher obtained in the course of the previous iteration. Thus, the size of the pseudo random sequences produced, corresponding in the present case to the authentication coupons $t_j$ of the reader, is parameterizable, as a function of the number of iterations chosen during the implementation of the block cipher algorithm. This number of iterations, and therefore the size of the coupons $t_i$ for authenticating the reader, can be fixed according to the needs of an application that implements the authentication method according to the invention.

The invention is not limited to the PRESENT block cipher algorithm for the pseudo random function FUNCTION, nor to the OFB mode. Thus, in other exemplary embodiments of the invention, known algorithms such as "3DES" (for triple "Data Encryption Standard") or "AES" (for "Advanced Encryption Standard") can be used. Moreover, the block cipher algorithms can be used in "CTR" (from the English "CounTeR") mode. Finally, in another exemplary embodiment, the function FUNCTION may be a second pseudo random function PRF'. The block cipher algorithms are suited to producing authentication coupons for the reader of large size. Thus, in the case in which the reversible operation REV is an EXCLUSIVE OR operation, the function FUNCTION is preferably a block cipher algorithm.

A radio tag T according to a first exemplary embodiment of the invention will now be described in relation to FIG. 3. The tag T is suited to conversing with a radio reader (not shown in FIG. 3) in the course of an authentication sequence in accordance with the steps of the method described previously.

In the particular example described here, the tag T is a passive device receiving its power from the radio reader during interrogation by the latter. The tag T comprises:
  an antenna 30 suited to sending to the reader and receiving from the reader,
  storage means 31, such as a memory, suited to storing the secret key s from the GPS key pair (s, V), the first regeneration key k, the first pseudo random function PRF, the second regeneration key k', the function FUNCTION for generating the authentication coupons of the reader, the reversible operation REV, the redundancy value padd and the authentication coupons $x_i$ of the tag when they are precalculated,
  a silicon chip 32 comprising a plurality of transistors suited to making up logic gates in an unprogrammable wired logic unit. The wired logic unit defines:
    reception means 33, coupled to the antenna 30, which are suited to receiving from the reader the information $z_j$ ciphered by means of the reversible operation REV, parameterized by the authentication coupon $t_j$ of the reader, and a data item allowing determination of the index j for identifying the authentication coupon of the reader. In one variant, the reception means 33 are likewise designed to receive the challenge c,
    means 34 for calculating a current authentication coupon $t_j'$ that are designed to calculate the current coupon $t_j'$ by applying the function, FUNCTION parameterized by the second regeneration key k', to the index j received from the reader by the reception means 33,
    decipher means 35, designed to decipher the ciphered information $z_j$ received by the reception means 33. The decipher means 35 are designed to apply the reversible operation REV, parameterized by the current $t_j'$ coupon calculated by the calculation means 34, to the ciphered information $z_j$,
    checking means 36, designed to check the redundancy value padd, obtained after deciphering of the ciphered information $z_j$ by the decipher means 35. The checking means 36 allow checking to determine that the authentication of the reader has been successful.

The means 34 for calculating a current coupon are designed to implement step E21-7 of calculation of a current authentication coupon.

The decipher means 35 are suited to implementing step E21-8 of deciphering.

The checking means 36 are designed to implement step E21-9 of checking.

Figure 3:
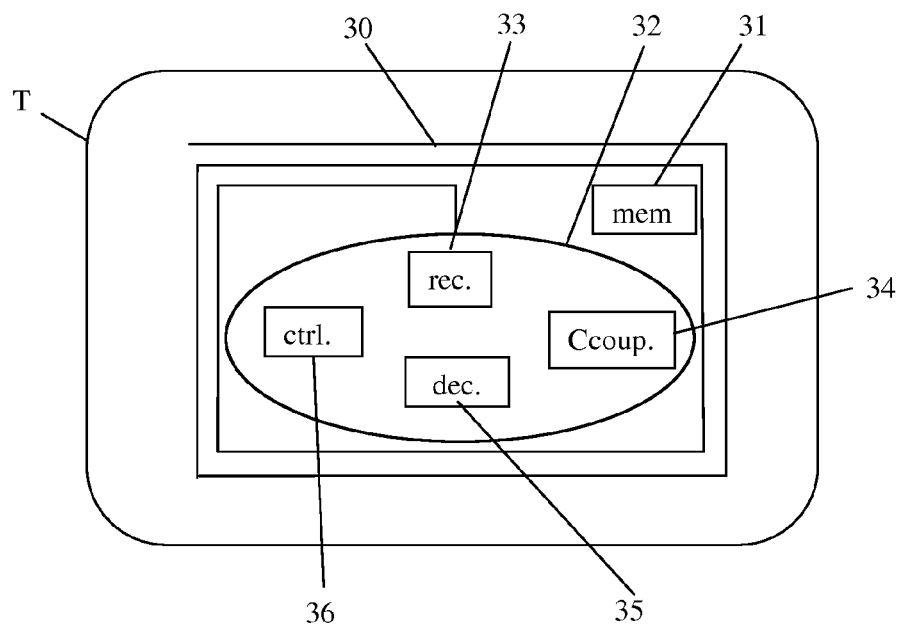
FIG. 3 shows a particular exemplary embodiment of a radio tag designed to authenticate a radio reader according to the invention and described in relation to FIG. 4.

In a variant embodiment in which the tag authenticates itself to the reader, the tag T likewise comprises:
  selection means, not shown in FIG. 3, suited to selecting a subscript i for identifying an authentication coupon $x_i$ for the tag,
  sending means, not shown in FIG. 3, coupled to the antenna 30, which are suited to sending the index i for identifying the authentication coupon $x_i$ of the tag, said index being chosen by the selection means. The sending means are likewise suited to sending the reader a response y to the challenge c received from the reader and calculated by authentication means, which are not shown in FIG. 3,
  the means for authenticating the tag, which are designed to regenerate the random $r_i$ and to calculate a response y to the challenge received from the reader R. The authentication means are implemented only if the verification performed by the checking means 36 is positive.

In a particular embodiment of the invention, which is not explained in detail, the tag T is an active device. The tag T is then equipped with a battery that allows it to transmit signals. Thus, the tag T and the reader R are able to interact over a longer distance than in the case in which the tag T is a passive device that receives its power from the reader.

A radio reader R according to a first exemplary embodiment of the invention will now be described in relation to FIG. 4.

The radio reader R is an active device, transmitting radio frequencies, that activates a tag (not shown in FIG. 4) that comes into proximity thereof by providing it with a power that it needs. The reader R according to the invention is suited to conversing with the tag in the course of an authentication sequence in accordance with the steps of the method according to the invention that have been described previously.

The reader R comprises several modules:
- a processing unit 40, or "CPU" (from the English "Control Processing Unit"),
- a set 41 of memories, including a volatile memory, or "RAM" ("Random Access Memory"), which is used to execute code instructions, to store variables, etc., and a rewritable memory of "EEPROM" for "Electrically Erasable Programmable Read-Only Memory" type that is suited to storing in memory the authentication coupons t, of the reader, the redundancy value padd,
- an antenna 42, which is suited to transmitting and receiving by radio,
- a module 43 for selecting coupons, which is designed to obtain the authentication coupon $t_j$ of the reader,
- a cipher module 44, which is designed to apply the reversible operation REV, parameterized by the authentication coupon $t_i$ of the reader retrieved by the selection module 43, to a piece of information comprising at least the redundancy value padd,
- a sending module 45, coupled to the antenna 42, which is designed to send the tag the information ciphered by the cipher module 44, the challenge c generated by the module 45 for generating a challenge and a data item allowing determination of an index for identifying the authentication coupon of the reader.

Figure 4:
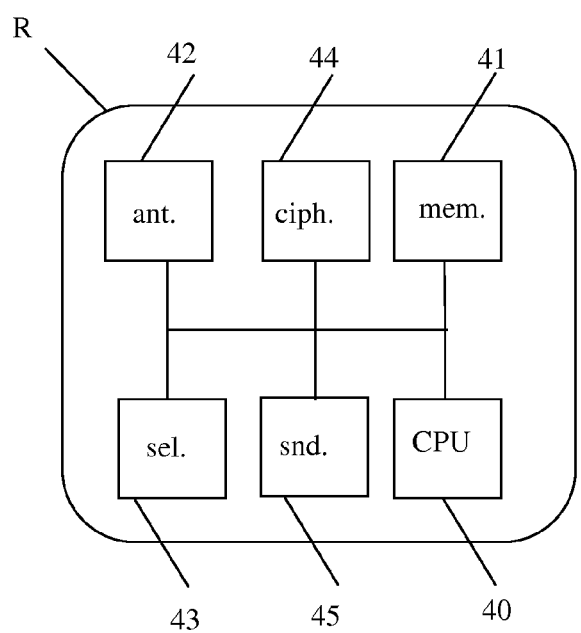
FIG. 4 shows an exemplary embodiment of a radio reader designed to authenticate itself to a radio tag as shown in FIG. 3.

In a variant embodiment, not shown in FIG. 4, in which the reader authenticates the tag, the reader R likewise comprises:
- an authentication module, designed to authenticate the tag,
- a reception module, coupled to the antenna 42 and designed to receive from the tag a data item allowing determination of an index i for identifying an authentication coupon for the reader $t_i$, chosen by the tag, and to receive an authentication coupon $x_i$ for the tag. They are likewise designed to receive from the tag the response y to the challenge c,
- a module for generating a challenge, which is designed to randomly generate a challenge c.

In a variant embodiment of the invention, the reader R comprises means for communication (which are not shown) with the calculation entity, which are designed to request and receive a coupon for a current authentication.

The modules communicate via a communication bus.

The module for selecting a coupon 43, the sending module 45 and the cipher module 44 are preferably software modules comprising software instructions for carrying out the steps of the mutual authentication method described in relation to FIG. 2.

The module 43 for selecting a coupon is designed to implement step E21-2 of reception that has been described previously. The cipher module 44 is designed to implement step E21-5 of ciphering. The sending module 45 is designed to implement step E21-5 of sending.

The invention also concerns:
- a computer program having instructions for the implementation of the method for mutual authentication of a tag and a reader as described previously when this program is executed by a processor;
- a recording medium that can be read by a reader and on which the computer program described above is recorded.

The software modules can be stored in or transmitted by a data storage medium. The latter may be a hardware storage medium, for example a CD-ROM, a magnetic floppy disk or a hard disk, or else a transmission medium such as a signal, or a telecommunication network.

The invention likewise relates to a radio system comprising at least one tag T that is described in relation to FIG. 3 and a reader R that is described in relation to FIG. 4.

Although the present disclosure has been described with reference to one or more examples, workers skilled in the art will recognize that changes may be made in form and detail without departing from the scope of the disclosure and/or the appended claims.

The invention claimed is:

1. A method for authenticating a reader to a radio tag, comprising the following steps, which are implemented by the tag:
   - a step of receiving at least a ciphered piece of information and a data item allowing determination of an index for identifying an authentication coupon for the reader, said piece of information being ciphered by applying a reversible operation to the authentication coupon associated to the index and to a predefined redundancy value,
   - an operation of calculating a current authentication coupon for the reader as a function of the index determined from the received data item and of a regeneration key owned by the tag,
   - an operation of deciphering the received piece of information ciphered by the reversible operation, which is applied to the calculated current authentication coupon and to the ciphered piece of information, and
   - an operation of checking the deciphered piece of information to verify that the calculated current coupon corresponds to the authentication coupon used by the reader in order to cipher the predefined redundancy value.

2. A method for authenticating a reader to a radio tag, comprising the following steps, which are implemented by the reader:
   - a step of selecting an authentication coupon for the reader associated to an index,
   - a step of ciphering a piece of information obtained by applying a reversible operation to the authentication coupon of the reader associated to the index and to a predefined redundancy value, and
   - a step of sending at least the ciphered piece of information and a data item allowing determination of the index of the authentication coupon of the reader.

3. The method as claimed in claim 1, comprising:
   - a step of transmission, by the tag to the reader, of a precalculated authentication coupon for the tag and of a data item allowing determination of an index for identifying the authentication coupon of the tag, and
   - a step of finalization of the authentication of the tag, said finalization step being carried out only if the calculated current coupon corresponds to the authentication coupon used by the reader in order to apply the reversible operation.

4. The method as claimed in claim 1, in which the predefined redundancy value comprised in the piece of information received ciphered by the tag contains n bits, with n≥1.

5. The method as claimed in claim 1, in which the piece of information received ciphered by the tag comprises a sensitive piece of information of m bits, which is concatenated to a redundancy value of n bits, with n≥1 and m≥1.

6. The method as claimed in claim 1, in which the reversible operation applied to the authentication coupon associated to the index and to the predefined redundancy value comprises an EXCLUSIVE OR between the authentication coupon of the reader and the predefined redundancy value.

7. The method as claimed in claim 1, in which the reversible operation applied to the authentication coupon associated to the index and to the predefined redundancy value is the block cipher algorithm PRESENT, parameterized by the authentication coupon of the reader and applied to the predefined redundancy value.

8. The method as claimed in claim 3, in which a challenge is received from the reader during the step of receiving the ciphered piece of information and the data item, the step of finalization of the authentication of the tag comprising sending a response, as a function of the challenge.

9. The method as claimed in claim 3, in which the step of finalization of the authentication of the tag comprises, when the current authentication coupon of the reader comprises n+m first bits followed by m' second bits:
a step of transmission, from the tag to the reader, of a second sensitive piece of information of m' bits, the transmission step comprising:
an EXCLUSIVE OR operation between the m' second bits of the current authentication coupon of the reader and the m' bits of the second piece of information,
a step of sending the second ciphered sensitive piece of information.

10. The method as claimed in claim 3, in which the reversible operation is the block cipher algorithm PRESENT, parameterized by the authentication coupon of the reader and applied to the piece of information, and in which the step of finalization of the authentication of the tag comprises:
a step of transmission of a second sensitive piece of information from the tag to the reader, the transmission step comprising:
application of the PRESENT cipher algorithm to the authentication coupon ($t_j'$) of the reader and to the second sensitive piece of information,
a step of sending the second ciphered sensitive piece of information to the reader.

11. The authentication method as claimed in claim 1, in which the authentication coupon of the reader is calculated by the tag by application of a block cipher algorithm in an Output Feedback (OFB) mode, parameterized by the regeneration key, to the index.

12. A radio tag suited to authenticating a radio reader and to authenticating itself to a radio reader, said tag comprising:
reception means for receiving at least a ciphered piece of information and a data item allowing determination of an index for identifying an authentication coupon of the reader, said piece of information being obtained by applying a reversible operation to the authentication coupon of the reader and to a predefined redundancy value,
calculation means for calculating a current authentication coupon for the reader as a function of the index determined from the received data item,
decipher means for deciphering the received piece of information ciphered by the reversible operation applied to the calculated current authentication coupon and to the ciphered piece of information,
checking means for checking the deciphered piece of information and verifying that the calculated current coupon corresponds to the authentication coupon used to cipher the predefined redundancy value.

13. A radio reader suited to authenticating itself to at least one radio tag and to authenticating the tag, said reader comprising:
selection means for selecting an authentication coupon for the reader associated to an index,
cipher means for ciphering a piece of information by applying a reversible operation to the authentication coupon of the reader associated to the index and to a predefined redundancy value,
sending means for sending at least the ciphered piece of information and a data item allowing determination of an index for identifying the authentication coupon of the reader.

14. A radio authentication system comprising:
a radio tag, which comprises:
reception means for receiving at least a ciphered piece of information and a data item allowing determination of an index for identifying an authentication coupon of a radio reader, said piece of information being ciphered by applying a reversible operation to the authentication coupon of the radio reader and to a predefined redundancy value,
calculation means for calculating a current authentication coupon for the radio reader as a function of the index determined from the received data item,
decipher means for deciphering the received piece of information ciphered by the reversible operation applied to the calculated current authentication coupon and to the ciphered piece of information, and
checking means for checking the piece of information and verifying that the calculated current coupon corresponds to the authentication coupon used to cipher the predefined redundancy value; and
the radio reader, which comprises:
selection means for selecting the authentication coupon for the radio reader associated to the index,
cipher means for ciphering the piece of information by applying the reversible operation to the authentication coupon of the radio reader associated to the index and to the predefined redundancy value,
sending means for sending at least the ciphered piece of information and the data item allowing determination of the index for identifying the authentication coupon of the radio reader.

15. A non-transitory computer-readable medium comprising a computer program stored thereon and comprising instructions for implementing steps of a method for authentication of radio reader to a radio tag, which are carried out by the radio reader when the program is executed by a processor, wherein the method comprises:
a step of selecting an authentication coupon for the reader associated to an index,
a step of ciphering a piece of information by applying a reversible operation to the authentication coupon of the reader associated to the index and to a predefined redundancy value, and a step of sending at least the ciphered piece of information and a data item allowing determination of the index of the authentication coupon of the reader.

\* \* \* \* \*